US012084082B2

(12) United States Patent
He

(10) Patent No.: US 12,084,082 B2
(45) Date of Patent: Sep. 10, 2024

(54) DETERMINATION DEVICE, VEHICLE CONTROL DEVICE, DETERMINATION METHOD, AND STORAGE MEDIUM

(71) Applicant: HONDA MOTOR CO., LTD., Tokyo (JP)

(72) Inventor: Yuchen He, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 312 days.

(21) Appl. No.: 17/667,589

(22) Filed: Feb. 9, 2022

(65) Prior Publication Data
US 2022/0266855 A1 Aug. 25, 2022

(30) Foreign Application Priority Data

Feb. 19, 2021 (JP) .................................. 2021-025556

(51) Int. Cl.
*B60W 60/00* (2020.01)
*B60W 40/09* (2012.01)
*G06V 20/58* (2022.01)

(52) U.S. Cl.
CPC .......... *B60W 60/001* (2020.02); *B60W 40/09* (2013.01); *G06V 20/584* (2022.01); *B60W 2420/403* (2013.01)

(58) Field of Classification Search
CPC ............... G06V 20/584; G06V 20/588; B60W 2420/403; B60W 40/09; B60W 60/001
See application file for complete search history.

(56) References Cited

U.S. PATENT DOCUMENTS 10,789,844 B1 * 9/2020 Whikehart ......... G01C 21/3685
11,157,648 B1 * 10/2021 Amico .................... G06F 21/73
11,494,514 B1 * 11/2022 Amico .................... G06F 21/73
(Continued)

FOREIGN PATENT DOCUMENTS

EP 2669844 A2 * 12/2013 ......... G06K 9/00798
JP 10-111136 4/1998
(Continued)

OTHER PUBLICATIONS

Japanese Decision of Rejection for Japanese Patent Application No. 2021-025556 mailed May 16, 2023.
(Continued)

*Primary Examiner* — Babar Sarwar
(74) *Attorney, Agent, or Firm* — Amin, Turocy & Watson, LLP

(57) ABSTRACT

A determination device of an embodiment includes a processor configured to execute computer-readable instructions to perform acquiring a primary determination result of a surrounding environment determined based on a first surroundings image of a vehicle and a certainty degree of the primary determination result, performing secondary determination of the primary determination result based on both a comparison result between the certainty degree and a preset threshold value and a past primary determination result of a surroundings image of the vehicle captured in the past earlier than the first surroundings image, and to outputting a secondary determination result having higher accuracy than the primary determination result.

13 Claims, 8 Drawing Sheets

(56) References Cited

U.S. PATENT DOCUMENTS

| | | | | |
|---|---|---|---|---|
| 2016/0144787 A1* | 5/2016 | Saward | ................ | H04N 1/2145 |
| | | | | 701/29.1 |
| 2020/0160076 A1* | 5/2020 | Suzuki | ................... | G06V 20/56 |
| 2020/0166931 A1* | 5/2020 | Park | .................. | B60W 50/0205 |
| 2021/0245711 A1* | 8/2021 | Nagata | ................... | H04N 7/181 |

FOREIGN PATENT DOCUMENTS

| | | | | |
|---|---|---|---|---|
| JP | 10-273062 | | 10/1998 | |
| JP | 2006-199242 | | 8/2006 | |
| JP | 2009-037284 | | 2/2009 | |
| JP | 2010-069921 | | 4/2010 | |
| JP | 2011-150689 | | 8/2011 | |
| JP | 2013-168019 | | 8/2013 | |
| JP | 2014-006885 | | 1/2014 | |
| WO | WO-2020071683 A1 * | 4/2020 | ............ | B60W 40/02 |

OTHER PUBLICATIONS

Japanese Office Action for Japanese Patent Application No. 2021-025556 mailed Nov. 29, 2022.

* cited by examiner

DETERMINATION DEVICE, VEHICLE CONTROL DEVICE, DETERMINATION METHOD, AND STORAGE MEDIUM

CROSS-REFERENCE TO RELATED APPLICATION

Priority is claimed on Japanese Patent Application No. 2021-025556, filed Feb. 19, 2021, the content of which is incorporated herein by reference.

BACKGROUND OF THE INVENTION

Field of the Invention

The present invention relates to a determination device, a vehicle control device, a determination method, and a storage medium.

Description of Related Art

In the related art, a technique in which a traveling state of another vehicle is detected on the basis of a surroundings image captured by an in-vehicle camera of an own vehicle and autonomous driving control of the own vehicle is performed is known.

SUMMARY OF THE INVENTION

In the technique of the related art, in a case where image quality of the captured surroundings image is poor due to backlight or the like, a traveling state of another vehicle cannot be accurately detected, and over-detection may occur. If such over-detection occurs, a problem in autonomous driving control such as a sudden braking operation erroneously performed in the own vehicle with the autonomous driving control may occur. A technique in which vehicle-to-vehicle communication is used to improve detection accuracy for other vehicles is known (for example, refer to Japanese Unexamined Patent Application, First Publication No. 2013-168019). However, in a case where such vehicle-to-vehicle communication is premised, the number of vehicles equipped with a vehicle-to-vehicle communication function may be limited, and a system configuration may become complicated, and thus costs may increase.

The present invention has been made in consideration of such circumstances, and an object of the present invention is to provide a determination device, a vehicle control device, a determination method, and a storage medium capable of detecting a surrounding environment by an accurate and simple method.

A determination device, a vehicle control device, a determination method, and a storage medium according to the present invention employ the following configurations.

(1) A determination device of an aspect of the present invention includes a processor configured to execute computer-readable instructions to perform acquiring a primary determination result of a surrounding environment determined based on a first surroundings image of a vehicle and a certainty degree of the primary determination result, performing secondary determination of the primary determination result based on both a comparison result between the certainty degree and a preset threshold value and a past primary determination result of a surroundings image of the vehicle captured in the past earlier than the first surroundings image, and outputting a secondary determination result having higher accuracy than the primary determination result.

According to an aspect of (2), in the determination device according to the aspect of (1), the threshold value includes a first threshold value and a second threshold value lower than the first threshold value, and the processor executes the computer-readable instructions to perform performing first processing of outputting the primary determination result as the secondary determination result in a case where the certainty degree is greater than the first threshold value, performing second processing of withholding the secondary determination in a case where the certainty degree is less than the second threshold value, and performing third processing of determining whether or not the primary determination result is employed as the secondary determination result based on the past primary determination result in a case where the certainty degree is equal to or less than the first threshold value and equal to or more than the second threshold value.

According to an aspect of (3), in the determination device according to the aspect of (2), in the third processing, the processor executes the computer-readable instructions to perform outputting the primary determination result as the secondary determination result in a case where the number of the past primary determination results indicating the same determination result as the primary determination result among a predetermined number of the past primary determination results is equal to or more than a predetermined value, and withholding the secondary determination in a case where the number of the past primary determination results indicating the same determination result as the primary determination result among a predetermined number of the past primary determination results is less than the predetermined value.

According to an aspect of (4), in the determination device according to the aspect of (3), the predetermined number of the past primary determination results is an integer N of 2 or more, and the predetermined value is a value of N/2 or more and N or less.

According to an aspect of (5), in the determination device according to any one of the aspects of (2) to (4), in a case where withholding the secondary determination, the processor executes the computer-readable instructions to perform outputting information indicating that the secondary determination is impossible.

According to an aspect of (6), in the determination device according to any one of the aspects of (1) to (5), the primary determination result is a determination result of a traveling state of a surrounding vehicle included in the first surroundings image based on operation information on a lamp body of the surrounding vehicle.

According to an aspect of (7), in the determination device according to the aspect of (6), the lamp body includes at least one of a brake light and a direction indicator.

(8) A vehicle control device of another aspect of the present invention includes: the determination device according to any one of the aspects of (1) to (7); and a controller configured to determine whether or not behavior control of the vehicle needs to be changed based on the secondary determination result output from the determination device.

According to an aspect of (9), in the vehicle control device according to the aspect of (8), in a case where the controller determines that the behavior control of the vehicle needs to be changed based on the secondary determination result, the controller changes the behavior control of the vehicle.

According to an aspect of (10), in the vehicle control device according to the aspect of (8) or (9), in a case where the controller determines that the behavior control of the vehicle does not need to be changed on the basis of the secondary determination result, the controller does not change the behavior control of the vehicle.

According to an aspect of (11), in the vehicle control device according to any one of the aspects of (8) to (10), in a case where the secondary determination is withheld by the determiner, the controller determines whether or not the behavior control of the vehicle needs to be changed based on surrounding environment information acquired by a detection means different from a camera that captures the first surroundings image.

According to an aspect of (12), in the vehicle control device according to any one of the aspects (8) to (11), the controller determines whether or not at least one of speed control, acceleration control, steering control, and stop control of the vehicle needs to be changed.

(13) A determination method of still another aspect of the present invention is a method including acquiring, by a computer installed in a vehicle, a primary determination result of a surrounding environment determined based on a first surroundings image of the vehicle and a certainty degree of the primary determination result, performing, by the computer, secondary determination of the primary determination result based on both a comparison result between the certainty degree and a preset threshold value and a past primary determination result of a surroundings image of the vehicle captured in the past earlier than the first surroundings image, and outputting, by the computer, a secondary determination result having higher accuracy than the primary determination result.

(14) A computer-readable non-transitory storage medium that stores a program of still another aspect of the present invention causes a computer installed in a vehicle to perform acquiring a primary determination result of a surrounding environment determined based on a first surroundings image of the vehicle and a certainty degree of the primary determination result, performing secondary determination of the primary determination result based on both a comparison result between the certainty degree and a preset threshold value and a past primary determination result of the surroundings image of the vehicle captured in the past earlier than the first surroundings image, and outputting a secondary determination result having higher accuracy than the primary determination result.

According to the above aspects (1) to (14), it is possible to detect the surrounding environment by an accurate and simple method, and it is possible to suppress the occurrence of the over-detection of the surrounding environment.

According to the above aspects (6) and (7), it is possible to improve a detection rate of the traveling state of the surrounding vehicle.

According to the above aspects (8) to (12), it is possible to perform stable autonomous driving control by determining whether or not behavior control of the own vehicle needs to be changed on the basis of the secondary determination result.

DETAILED DESCRIPTION OF THE INVENTION

Hereinafter, embodiments of a determination device, a vehicle control device, a determination method, and a storage medium of the present invention will be described with reference to the drawings.

[Outline]

A determination device of the present invention acquires a primary determination result of a surrounding environment (for example, a traveling state of another vehicle) determined on the basis of a surroundings image of an own vehicle and a certainty degree of the primary determination result and performs secondary determination of the primary determination result on the basis of both a comparison result between the certainty degree and a threshold value and a past primary determination result of a surroundings image captured in the past earlier than the surroundings image which is a determination target. As a result, it is possible to obtain a secondary determination result having higher accuracy than the primary determination result, and it is possible to detect the surrounding environment by an accurate and simple method.

[Overall Structure]

Figure 1:
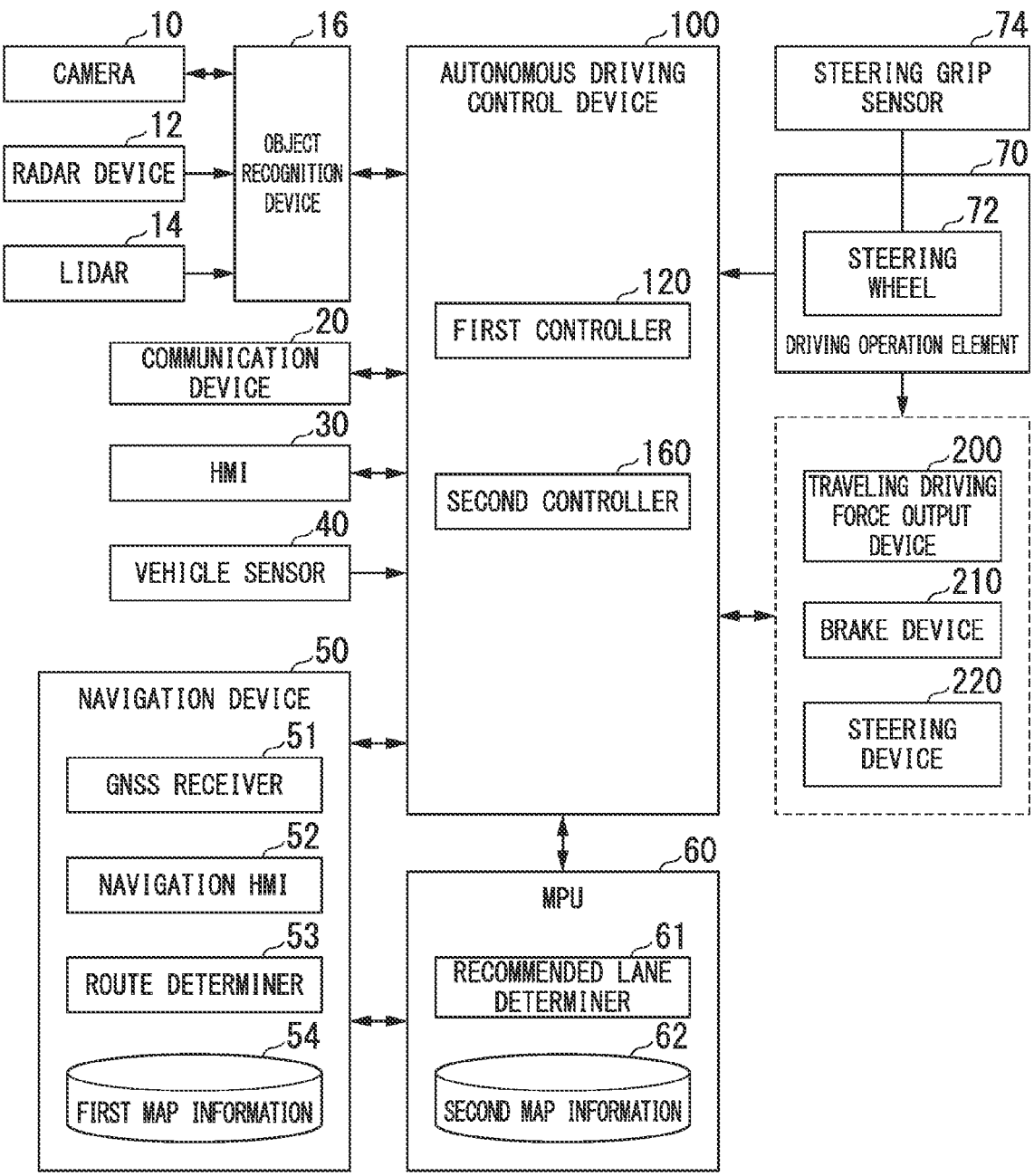
FIG. 1 is a configuration diagram of a vehicle system using a determination device according to an embodiment.

FIG. 1 is a configuration diagram of a vehicle system 1 using a determination device according to the embodiment. The vehicle on which the vehicle system 1 is installed is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. An electric motor operates using electric power generated by a generator connected to an internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, and a vehicle sensor 40, a navigation device 50, a map positioning unit (MPU) 60, a driving operation element 70, an autonomous driving control device 100, a traveling driving force output device 200, a brake device 210, and a steering device 220. These devices and instruments are connected to each other through a multiplex communication line such as a controller area network (CAN) communication line, a serial communication line, a wireless communication network, or the like. A configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary location on the vehicle on which the vehicle system 1 is installed (hereinafter referred to as an own vehicle M). In a case where a portion in front of the vehicle is imaged, the camera 10 is attached to an upper portion of a front windshield, a back surface of a rear-view mirror, or the like. In a case where a portion behind the vehicle is imaged, the camera 10 is attached to an upper portion of a rear windshield, a back door, or the like. In a case where a portion on a lateral side from the vehicle is imaged, the camera 10 is attached to a door mirror or the like. The camera 10 periodically and repeatedly images the surroundings of the own vehicle M, for example. The camera 10 may be a stereo camera.

The radar device 12 radiates radio waves such as millimeter waves to the surroundings the own vehicle M and also detects radio waves reflected from an object (reflection waves) to detect at least a position (a distance and an orientation) of the object. The radar device 12 is attached to an arbitrary location on the own vehicle M. The radar device 12 may detect the position and the speed of the object by a frequency modulated continuous wave (FM-CW) method.

The LIDAR 14 irradiates the surroundings of the own vehicle M with light (or electromagnetic waves having a wavelength close to that of light) and measures the scattered light. The LIDAR 14 detects a distance to a target on the basis of a time from light emission to light reception. The emitted light is, for example, a pulsed laser beam. The LIDAR 14 is attached to an arbitrary location on the own vehicle M.

The object recognition device 16 performs sensor fusion processing on detection results of a part or all of the camera 10, the radar device 12, and the LIDAR 14 and recognizes the position, the type, the speed, and the like of the object. The object recognition device 16 outputs recognition results to the autonomous driving control device 100. The object recognition device 16 may output the detection results of the camera 10, the radar device 12, and the LIDAR 14 to the autonomous driving control device 100 as they are. The object recognition device 16 may be omitted from the vehicle system 1.

The communication device 20 communicates with another vehicle existing in the surroundings of the own vehicle M using, for example, a cellular network, a Wi-Fi network, Bluetooth (a registered trademark), dedicated short range communication (DSRC), or communicates with various server devices via a wireless base station.

The HMI 30 presents various items of information to the occupant of the own vehicle M and also accepts input operations by the occupant. The HMI 30 includes various display devices, speakers, buzzers, touch panels, switches, keys, and the like.

The vehicle sensor 40 includes a vehicle speed sensor that detects the speed of the own vehicle M, an acceleration sensor that detects the acceleration thereof, an orientation sensor that detects the direction of the own vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies the position of the own vehicle M on the basis of a signal (radio waves arriving from an artificial satellite) received from a GNSS satellite. The position of the own vehicle M may be specified or complemented by an inertial navigation system (INS) using an output from the vehicle sensor 40. The navigation HMI 52 includes a display device, a speaker, a touch panel, keys, and the like. The navigation HMI 52 may be partially or wholly shared with the above-mentioned HMI 30. For example, the route determiner 53 determines a route from a position of the own vehicle M specified by the GNSS receiver 51 (or an arbitrary input position) to a destination input by the occupant using the navigation HMI 52 (hereinafter referred to as a route on a map) with reference to the first map information 54.

The first map information 54 is, for example, information in which a road shape is expressed with a link indicating a road and a node connected through the link. The first map information 54 may include road curvature, point of interest (POI) information, and the like. The route on the map is output to MPU 60. The navigation device 50 may perform route guidance using the navigation HMI 52 on the basis of the route on the map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on the map from the navigation server.

The MPU 60 includes, for example, a recommended lane determiner 61 and holds second map information 62 in a storage device such as an HDD or a flash memory. The recommended lane determiner 61 is realized by executing a program (software) by a hardware processor (a computer) such as a central processing unit (CPU). Further, the recommended lane determiner 61 may be realized by hardware (a circuit unit; including circuitry) such as a large scale integration (LSI), an application specific integrated circuit (ASIC), a field-programmable gate array (FPGA), and a graphics processing unit (GPU) or may be realized by the cooperation of software and hardware. The program may be stored in advance in a storage device (a storage device including a non-transitory storage medium) of the MPU 60, or may be stored in an attachable and detachable storage medium such as a DVD or a CD-ROM. In the latter case, the storage medium (the non-transitory storage medium) may be loaded in a drive device, and thus the program may be installed in the storage device of the MPU 60.

The recommended lane determiner 61 divides the route on the map provided by the navigation device 50 into a plurality of blocks (for example, divides the route into 100 [m] units in a vehicle traveling direction) and determines a recommended lane for each block while referring to the second map information 62. The recommended lane determiner 61 determines which lane to drive from the left. In a case where a branch location exists on the route on the map, the recommended lane determiner 61 determines the recommended lane such that the own vehicle M can travel on a reasonable route to proceed to a branch destination.

The second map information 62 is map information having higher accuracy than the first map information 54. The second map information 62 includes, for example, information on a center of a lane (a road center line, a center line), information on a boundary of a lane (a road lane marking line, a lane marking line), or the like. Further, the second map information 62 may include road information (road signs, road structures such as traffic signals), traffic regulation information, address information (an address and a postal code), facility information, telephone number information, and the like. The second map information 62 may be updated at any time through the communication device 20 communicating with another device.

The driving operation element 70 includes, for example, a steering wheel 72, an accelerator pedal, a brake pedal, a shift lever, and other operation elements. A sensor for detecting the amount of operation or the presence or absence of operation is attached to the driving operation element 70. The detection result of the sensor is output to the autonomous driving control device 100, or is output to a part or all of the traveling driving force output device 200, the brake device 210, and the steering device 220. The steering wheel 72 does not necessarily have to be annular and may be in a form of a modified steering wheel, a joystick, a button, or the like. A steering grip sensor 74 is attached to the steering wheel 72. The steering grip sensor 74 is realized by a capacitance sensor or the like and outputs a signal for detecting whether or not the driver is gripping the steering wheel 72 (a hand of the driver is in contact with the steering wheel 72 in a state where the driver applies a force to the steering wheel 72) to the autonomous driving control device 100.

The autonomous driving control device 100 includes, for example, a first controller 120 and a second controller 160. For example, the first controller 120 and the second controller 160 are each realized by executing a program (software) by a hardware processor (a computer) such as a CPU. Further, a part or all of these components may be realized by hardware (a circuit unit; including circuitry) such as an LSI, an ASIC, an FPGA, a GPU or may be realized by the cooperation of software and hardware. The program may be stored in advance in a storage device (a storage device including a non-transitory storage medium) such as an HDD or a flash memory of the autonomous driving control device 100, or may be stored in an attachable and detachable storage medium such as a DVD or a CD-ROM. In the latter case, the storage medium (the non-transitory storage medium) may be loaded in a drive device, and thus the program may be installed in an HDD or a flash memory of the autonomous driving control device 100.

Figure 2:
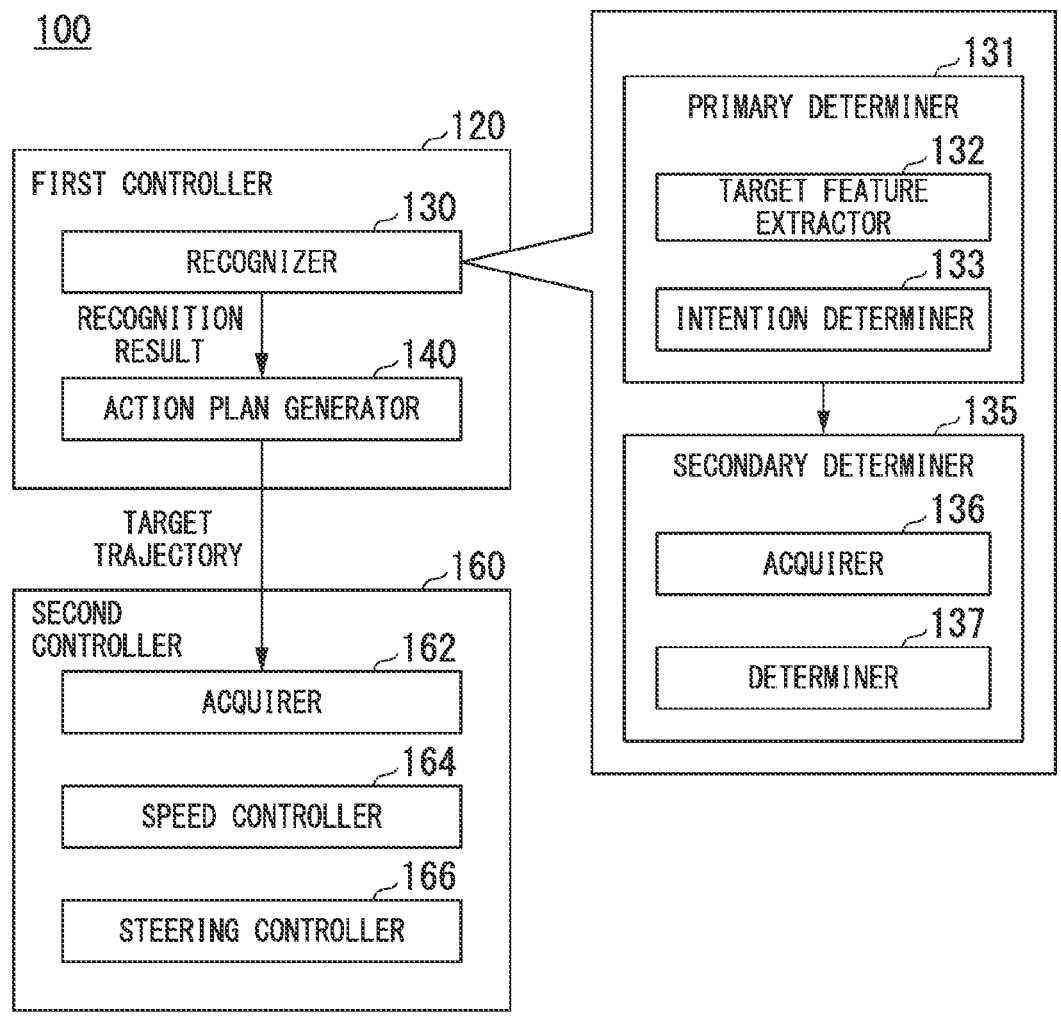
FIG. 2 is a functional configuration diagram of a first controller and a second controller according to the embodiment.

FIG. 2 is a functional configuration diagram of the first controller 120 and the second controller 160. The first controller 120 includes, for example, a recognizer 130 and an action plan generator 140. The autonomous driving control device 100, the first controller 120, or the recognizer 130 is an example of the "determination device." The autonomous driving control device 100 is an example of a "vehicle control device."

For example, the first controller 120 realizes a function by artificial intelligence (AI) and a function by a model given in advance in parallel. For example, the function of "recognizing an intersection" may be executed in parallel with a recognition of an intersection by deep learning or the like and a recognition based on a condition given in advance (there is a signal that can be pattern matched, a road sign, or the like), or may be realized by scoring both the recognitions and comprehensively evaluating them. As a result, the reliability of autonomous driving is ensured.

The recognizer 130 recognizes a state such as the position, the speed, or the acceleration of the object in the surroundings of the own vehicle M on the basis of at least a part of the information input from the camera 10, the radar device 12, and the LIDAR 14. The position of the object is recognized as, for example, a position on absolute coordinates with a representative point (a center of gravity, a center of a drive axis, or the like) of the own vehicle M set as an origin and is used for control. The position of the object may be represented by a representative point such as a center of gravity or a corner of the object, or may be represented by a region. The "state" of the object may include the acceleration, the jerk, or the "behavioral state" (for example, whether it is changing lanes or is about to change lanes) of the object.

Further, the recognizer 130 recognizes, for example, a lane (a traveling lane) in which the own vehicle M is traveling. For example, the recognizer 130 recognizes the traveling lane by comparing a pattern of a road lane marking line (for example, an arrangement of a solid line and a broken line) obtained from the second map information 62 and a pattern of a road lane marking line in the surroundings of the own vehicle M recognized from an image captured by the camera 10. The recognizer 130 may recognize the traveling lane by recognizing not only the road lane marking line but also a traveling road boundary (a road boundary) including the road lane marking line, a road shoulder, a curbstone, a median strip, a guardrail, and the like. In this recognition, the position of the own vehicle M acquired from the navigation device 50 and a processing result by the INS may be added. The recognizer 130 also recognizes a stop line, an obstacle, a red light, a tollgate, and other road events.

The recognizer 130 recognizes the position and posture of the own vehicle M with respect to the traveling lane when recognizing the traveling lane. The recognizer 130 may recognize, for example, a deviation of a reference point of the own vehicle M from the center of the lane and an angle formed between the traveling direction of the own vehicle M and a line along the center of the lane as a relative position and a posture of the own vehicle M with respect to the traveling lane. Instead of this, the recognizer 130 may recognize the position of the reference point of the own vehicle M with respect to any side end portion (a road lane marking line or a road boundary) of the traveling lane as the relative position of the own vehicle M with respect to the traveling lane.

The recognizer 130 includes, for example, a primary determiner 131 and a secondary determiner 135. The primary determiner 131 makes a primary determination of the surrounding environment of the own vehicle M on the basis of the surroundings image of the own vehicle M input from the camera 10. The surrounding environment includes, for example, a traveling state of a surrounding vehicle (another vehicle). For example, the primary determiner 131 determines the traveling state of another vehicle on the basis of image information of a lamp body of another vehicle included in the surroundings image of the own vehicle M. The lamp body includes a light source for various lights such as a brake lamp (a stop light) which is a brake light, a turn signal (a turn light) which is a direction indicator, a front light which is a headlight, and a backlight which is a reversing light. The surroundings image may be a black-and-white image or a color image. For example, the primary determiner 131 determines whether or not another vehicle is about to stop by determining an operating state (lighting and extinguishing of the brake lamp) of the brake lamp of another vehicle. Further, for example, the primary determiner 131 determines whether or not another vehicle is trying to change a course or to change a traveling direction such as turning left or right by determining the operating state of the turn signal of another vehicle (blinking of the turn signal). By performing such a primary determination, the primary determiner 131 can determine operation intention of a driver (operation intention of the lamp body) of another vehicle.

The primary determiner 131 includes, for example, a target feature extractor 132 and an intention determiner 133. The target feature extractor 132 performs rule-based image analysis processing such as pattern matching on the surroundings image input from the camera 10 and thus extracts feature information of an image corresponding to the lamp body of another vehicle included in the surroundings image. For example, the target feature extractor 132 extracts feature information of an image corresponding to the brake lamp and the turn signal of another vehicle included in the surroundings image.

The intention determiner 133 determines the operation intention of the driver (the operation intention of the lamp body) of another vehicle on the basis of the feature information extracted by the target feature extractor 132 and outputs an intention determination result (a primary determination result) and a certainty degree of this intention determination result. The intention determination result is information indicating the operating state of the lamp body of another vehicle such as blinking of a right turn signal, blinking of a left turn signal, and lighting of the brake lamp. That is, the intention determination result is a determination result of the traveling state of the surrounding vehicle included in the surroundings image based on the operation information on the lamp body of the surrounding vehicle.

The certainty degree of the intention determination result is an index value indicating certainty (reliability) of the intention determination result. For example, the certainty degree may be a real number value between 0 and 1, or a discrete value such as high, medium, or low. The intention determiner 133 derives the intention determination result and the certainty degree for the feature information using, for example, a trained model (for example, a neural network) obtained by machine learning. This trained model is a model trained to output the intention determination result and the certainty degree when the feature information is input using a data set labeled with the intention determination result and the certainty degree as training data for the feature information.

The intention determiner 133 outputs the intention determination result and the certainty degree on the basis of the feature information extracted from one surroundings image (a single frame) or the feature information extracted from a plurality of continuous surroundings images (sequential frames). For example, in a case where it is determined whether or not the brake lamp is lit, the intention determiner 133 outputs the intention determination result and the certainty degree on the basis of the feature information extracted from one surroundings image (a single frame). For example, in a case where it is determined whether or not the turn signal is blinking, the intention determiner 133 calculates the intention determination result and the certainty degree on the basis of the feature information extracted from a plurality of continuous surroundings images (sequential frames).

The above trained model may be a model trained to output the intention determination result and the certainty degree when the surroundings image is input using a data set labeled with the intention determination result and the certainty degree as training data for the surroundings image. In this case, rule-based image analysis processing such as pattern matching by the primary determiner 131 may be omitted.

The secondary determiner 135 includes, for example, an acquirer 136 and a determiner 137. The acquirer 136 acquires the intention determination result and the certainty degree output from the primary determiner 131. That is, the acquirer 136 acquires the primary determination result of the surrounding environment determined on the basis of the surroundings image (a first surroundings image) of the own vehicle M (the vehicle) and the certainty degree of the primary determination result. The acquirer 136 is an example of an "acquirer." The determiner 137 is an example of a "determiner."

The determiner 137 performs secondary determination of the intention determination result on the basis of both a comparison result between the certainty degree acquired by the acquirer 136 and a preset threshold value and a past intention determination result of a surroundings image of the own vehicle M captured in the past earlier than the surroundings image to be determined by the intention determiner 133 and outputs a secondary determination result having higher accuracy than the intention determination result. The determiner 137 outputs the secondary determination result to the action plan generator 140. The details of the processing of the determiner 137 will be described later.

In principle, the action plan generator 140 generates a target trajectory along which the own vehicle M travels in the future autonomously (regardless of the operation of the driver) such that the own vehicle M can travel in the recommended lane determined by the recommended lane determiner 61 and can respond a surrounding situation of the own vehicle M. The target trajectory contains, for example, a speed element. For example, the target trajectory is expressed as an arrangement of points (trajectory points) to be reached by the own vehicle M in order. The trajectory point is a point to be reached by the own vehicle M for each predetermined traveling distance (for example, about several [m]) along the road. Separately from that, for a predetermined sampling time (for example, about 0 comma number [sec]), a target speed and a target acceleration are generated as a part of the target trajectory. Further, the trajectory point may be a position to be reached by the own vehicle M at the sampling time for each predetermined sampling time. In this case, the information of the target speed and the target acceleration is expressed with an interval of the trajectory points. The action plan generator 140 is an example of a "controller."

The action plan generator 140 may set events for the autonomous driving when generating the target trajectory. The events for the autonomous driving include a constant speed traveling event, a low speed following traveling event, a lane change event, a branching event, a merging event, a takeover event, and the like. The action plan generator 140 generates a target trajectory according to an activated event.

The action plan generator 140 determines whether or not behavior control of the own vehicle M needs to be changed on the basis of the secondary determination result output from the recognizer 130. In a case where the action plan generator 140 determines that the behavior control of the own vehicle M needs to be changed on the basis of the secondary determination result, the action plan generator 140 changes the behavior control of the own vehicle M (changes the target trajectory or the like). Further, in a case where the action plan generator 140 determines that the behavior control of the own vehicle M does not need to be changed on the basis of the secondary determination result, the action plan generator 140 does not change the behavior control of the own vehicle M. The details of the processing of the action plan generator 140 will be described later.

The second controller 160 controls the traveling driving force output device 200, the brake device 210, and the steering device 220 such that the own vehicle M passes along the target trajectory generated by the action plan generator 140 at a scheduled time.

The second controller 160 includes, for example, an acquirer 162, a speed controller 164, and a steering controller 166. The acquirer 162 acquires the information on the target trajectory (the trajectory point) generated by the action plan generator 140 and stores it in a memory (not shown). The speed controller 164 controls the traveling driving force output device 200 or the brake device 210 on the basis of the speed element associated with the target trajectory stored in the memory. The steering controller 166 controls the steering device 220 according to a curving degree of the target trajectory stored in the memory. The processing of the speed controller 164 and the steering controller 166 is realized by, for example, a combination of feedforward control and feedback control. As an example, the steering controller 166 executes a combination of feedforward control according to the curvature of the road in front of the own vehicle M and feedback control based on a deviation from the target trajectory.

The traveling driving force output device 200 outputs a traveling driving force (torque) for the vehicle to travel to the drive wheels. The traveling driving force output device 200 includes, for example, a combination of an internal combustion engine, an electric motor, a transmission, and the like and an electronic control unit (ECU) that controls them. The ECU controls the above configuration according to the information input from the second controller 160 or the information input from the driving operation element 70.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to the information input from the second controller 160 or the information input from the driving operation element 70 such that the brake torque corresponding to the braking operation is output to each wheel. The brake device 210 may include a mechanism for transmitting the hydraulic pressure generated by the operation of the brake pedal included in the driving operation element 70 to the cylinder via a master cylinder as a backup. The brake device 210 is not limited to the configuration described above and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. For example, the electric motor exerts a force on a rack and pinion mechanism to change the direction of turning wheels. The steering ECU drives the electric motor according to the information input from the second controller 160 or the information input from the driving operation element 70 and changes the direction of the turning wheels.

[Determination Processing]

Hereinafter, determination processing according to the embodiment will be described with reference to a flowchart.

Figure 3:
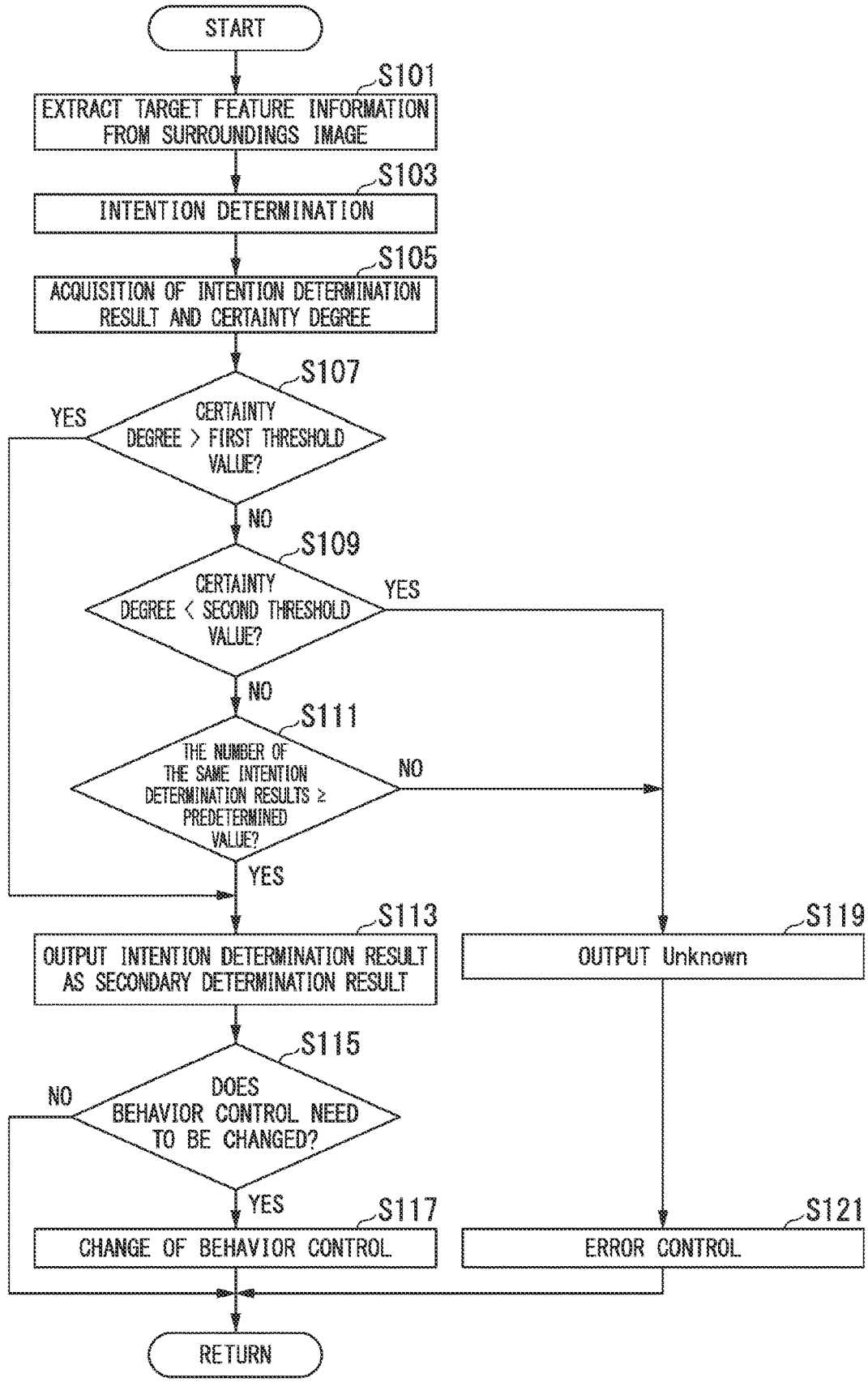
FIG. 3 is a flowchart showing an example of determination processing by a recognizer of an autonomous driving control device according to the embodiment.

FIG. 3 is a flowchart showing an example of the determination processing by the recognizer 130 of the autonomous driving control device 100 according to the embodiment. In the following description, a case where the own vehicle M is performing autonomous driving under the control of autonomous driving by the autonomous driving control device 100 will be described as an example. The determination processing of the flowchart shown in FIG. 3 is repeatedly executed while the own vehicle M is performing autonomous driving.

First, the target feature extractor 132 of the primary determiner 131 extracts target feature information from the surroundings image input from the camera 10 (step S101). For example, the target feature extractor 132 performs rule-based image analysis processing such as pattern matching on the surroundings image and thus extracts an image of a portion corresponding to the lamp body (the brake lamp, the turn signal, or the like) of another vehicle included in the surroundings image.

Figure 4A:
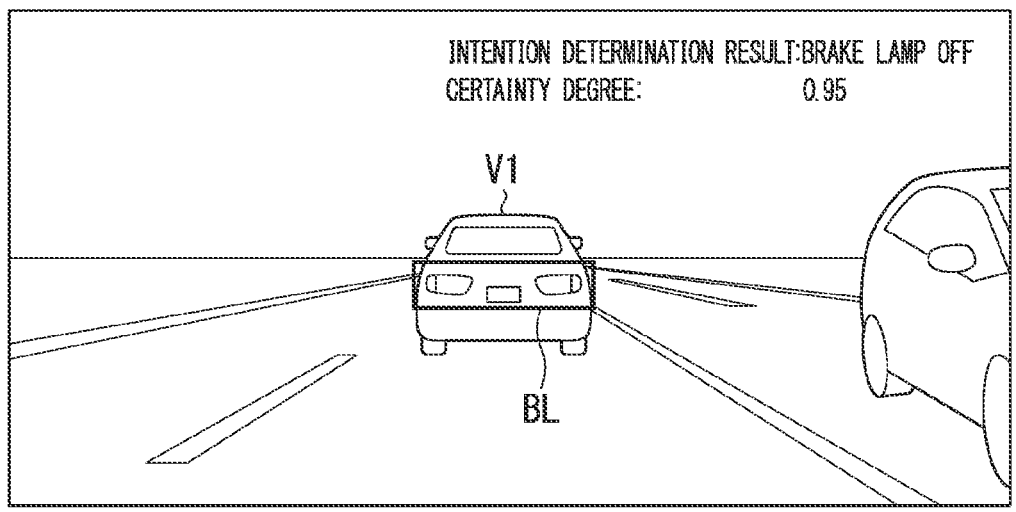
FIG. 4A is a diagram showing an example of a surroundings image obtained by capturing a portion in front of an own vehicle.

FIG. 4A is a diagram showing an example of a surroundings image obtained by capturing a portion in front of the own vehicle M. Another vehicle V1 traveling in front of the own vehicle M is included in a surroundings image F1 shown in FIG. 4A. In this case, the target feature extractor 132 extracts a brake lamp image BL of a portion corresponding to a brake lamp of another vehicle V1 as the target feature information from the surroundings image F1. The target feature extractor 132 may extract an image of a portion corresponding to a lamp body such as a turn signal other than the brake lamp of another vehicle V1 in addition to the brake lamp image BL from the surroundings image F1.

Figure 4B:
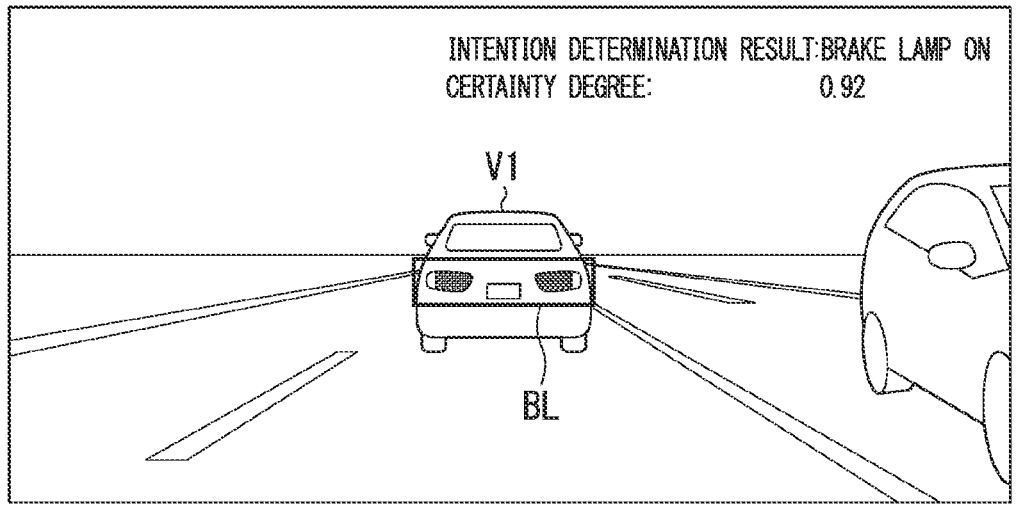
FIG. 4B is a diagram showing another example of a surroundings image obtained by capturing a portion in front of an own vehicle.

FIG. 4B is a diagram showing another example of a surroundings image obtained by capturing a portion in front of the own vehicle M. A surroundings image F2 shown in FIG. 4B is an image obtained by capturing at a timing different from that of the surroundings image F1 shown in FIG. 4A. In this case, the target feature extractor 132 extracts a brake lamp image BL of a portion corresponding to a brake lamp of another vehicle V1 as the target feature information from the surroundings image F2. The target feature extractor 132 may extract an image of a portion corresponding to a lamp body such as a turn signal other than the brake lamp of another vehicle V1 in addition to the brake lamp image BL from the surroundings image F2.

Figure 5A:
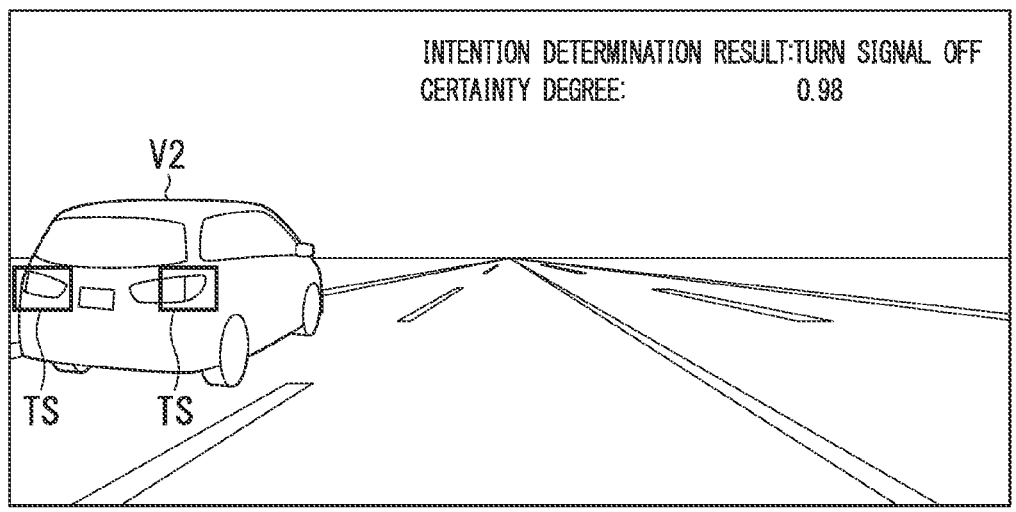
FIG. 5A is a diagram showing another example of a surroundings image obtained by capturing a portion in front of an own vehicle.

FIG. 5A is a diagram showing another example of a surroundings image obtained by capturing a portion in front of the own vehicle M. Another vehicle V2 traveling in front of a left lane of the own vehicle M is included in a surroundings image F3 shown in FIG. 5A. In this case, the target feature extractor 132 extracts a turn signal image TS of a portion corresponding to a turn signal of another vehicle V2 as the target feature information from the surroundings image F3. The target feature extractor 132 may extract an image of a portion corresponding to a lamp body such as a brake lamp other than the turn signal of another vehicle V2 in addition to the turn signal image TS from the surroundings image F3.

Figure 5B:
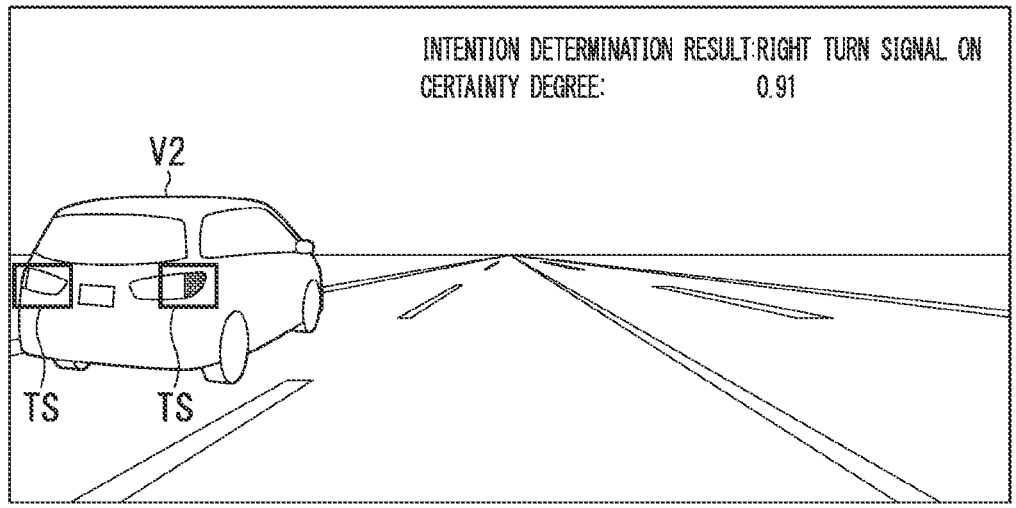
FIG. 5B is a diagram showing another example of a surroundings image obtained by capturing a portion in front of an own vehicle.

FIG. 5B is a diagram showing another example of a surroundings image obtained by capturing a portion in front of the own vehicle M. A surroundings image F4 shown in FIG. 5B is an image obtained by capturing at a timing different from that of the surroundings image F3 shown in FIG. 5A. In this case, the target feature extractor 132 extracts a turn signal image TS of a portion corresponding to a turn signal of another vehicle V2 as the target feature information from the surroundings image F4. The target feature extractor 132 may extract an image of a portion corresponding to a lamp body such as a brake lamp other than the turn signal of another vehicle V2 in addition to the turn signal image TS from the surroundings image F4.

Next, the intention determiner 133 of the primary determiner 131 determines the operation intention of the driver (the operation intention of the lamp body) of another vehicle on the basis of the target feature information extracted by the target feature extractor 132 (step S103). The intention determiner 133 outputs an intention determination result and a certainty degree of this intention determination result. For example, the intention determiner 133 outputs the intention determination result indicating whether or not the brake lamp is lit or whether or not the turn signal is blinking, and the certainty degree of the intention determination result.

In a case where the brake lamp image BL is extracted from the surroundings image F1 shown in FIG. 4A by the target feature extractor 132, the intention determiner 133 determines that the brake lamp is OFF on the basis of the brake lamp image BL and outputs the intention determination result indicating that the brake lamp is OFF. Further, in this case, it is possible to determine that the image quality of the brake lamp image BL is high and the certainty degree of the intention determination result is high, and thus the intention determiner 133 outputs a high numerical value "0.95" as the certainty degree.

Figure 6:
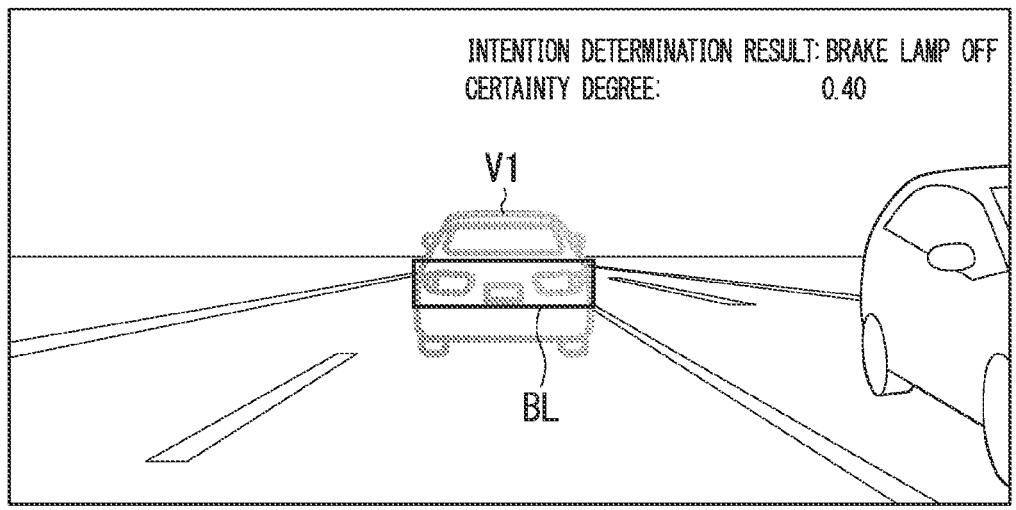
FIG. 6 is a diagram showing another example of a surroundings image obtained by capturing a portion in front of an own vehicle.

On the other hand, even if an image having the same scene as the surroundings image F1 shown in FIG. 4A is captured, in a case where there is a concern that there is a problem with the accuracy of the intention determination result such as a case where the image quality of the brake lamp image BL is low or a part of the image is missing as in a surroundings image F5 shown in FIG. 6, a low numerical value is output as the certainty degree. That is, in a case where the brake lamp image BL having a low image quality is extracted from the surroundings image F5 shown in FIG. 6 by the target feature extractor 132, the intention determiner 133 determines that the brake lamp is OFF on the basis of the brake lamp image BL and outputs the intention determination result indicating that the lamp is OFF. However, in this case, it is possible to determine that the image quality of the brake lamp image BL is low and the certainty degree of the intention determination result is low, and thus the intention determiner 133 outputs a low numerical value "0.40" as the certainty degree.

Further, in a case where the brake lamp image BL is extracted from the surroundings image F2 shown in FIG. 4B by the target feature extractor 132, the intention determiner 133 determines that the brake lamp is ON on the basis of the brake lamp image BL and outputs the intention determination result indicating that the brake lamp is ON. Further, in this case, it is possible to determine that the image quality of the brake lamp image BL is high and the certainty degree of the intention determination result is high, and thus the intention determiner 133 outputs a high numerical value "0.92" as the certainty degree.

Figure 7:
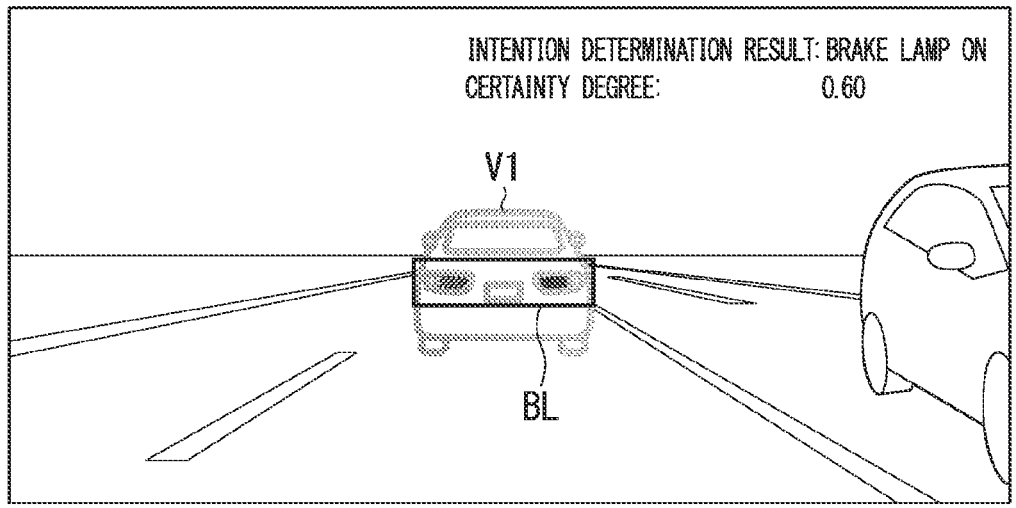
FIG. 7 is a diagram showing another example of a surroundings image obtained by capturing a portion in front of an own vehicle.

On the other hand, even if an image having the same scene as the surroundings image F2 shown in FIG. 4B is captured, in a case where there is a concern that there is a problem with the accuracy of the intention determination result such as a case where the image quality of the brake lamp image BL is low or a part of the image is missing as in a surroundings image F20 shown in FIG. 7, a low numerical value is output as the certainty degree. That is, in a case where the brake lamp image BL having a low image quality is extracted from the surroundings image F20 shown in FIG. 7 by the target feature extractor 132, the intention determiner 133 determines that the brake lamp is ON on the basis of the brake lamp image BL and outputs the intention determination result indicating that the lamp is ON. However, in this case, it is possible to determine that the image quality of the brake lamp image BL is low and the certainty degree of the intention determination result is low, and thus the intention determiner 133 outputs a low numerical value "0.60" as the certainty degree.

Further, in a case where the turn signal image TS is extracted from the surroundings image F3 shown in FIG. 5A by the target feature extractor 132, the intention determiner 133 determines that the turn signal (the right and left turn signals) is OFF on the basis of the turn signal image TS and outputs the intention determination result indicating that the turn signal is OFF. Further, in this case, it is possible to determine that the image quality of the turn signal image TS is high and the certainty degree of the intention determination result is high, and thus the intention determiner 133 outputs a high numerical value "0.98" as the certainty degree. Further, in a case where the turn signal image TS is extracted from the surroundings image F4 shown in FIG. 5B by the target feature extractor 132, the intention determiner 133 determines that the turn signal (the right turn signal) is ON on the basis of the turn signal image TS and outputs the intention determination result indicating that the right turn signal is ON. Further, in this case, it is possible to determine that the image quality of the turn signal image TS is high and the certainty degree of the intention determination result is high, and thus the intention determiner 133 outputs a high numerical value "0.91" as the certainty degree.

Next, the acquirer 136 of the secondary determiner 135 acquires the intention determination result and the certainty degree output from the intention determiner 133 (step S105).

Next, the determiner 137 of the secondary determiner 135 determines whether or not the acquired certainty degree is greater than a first threshold value (step S107). This first threshold value is set in advance as a criterion for determining whether or not the certainty degree is sufficiently high. For example, a lower limit value of the certainty degree for determining that the corresponding intention determination result is usable for the autonomous driving control is set as this first threshold value. In a case where the certainty degree is defined as a real number value between 0 and 1, a numerical value of 0.5 or more, for example, 0.9, 0.8, 0.7, 0.6, 0.5, or the like is set as this first threshold value. The determiner 137 may determine whether or not the acquired certainty degree is equal to or more than the first threshold value.

In a case where the determiner 137 determines that the acquired certainty degree is greater than the first threshold value (step S107, "YES"), the determiner 137 outputs the acquired intention determination result as a secondary determination result to the action plan generator 140 (step S113). Next, the action plan generator 140 determines whether or not the behavior control of the own vehicle M needs to be changed on the basis of the secondary determination result output from the recognizer 130 (step S115). For example, the action plan generator 140 determines whether or not at least one of speed control, acceleration control, steering control, and stop control of the own vehicle M needs to be changed.

In step S115, in a case where the action plan generator 140 determines that the behavior control of the own vehicle M needs to be changed (step S115, "YES"), the action plan generator 140 changes the behavior control (step S117). For example, as in the example of FIG. 4B, in a case where the intention determination result indicates that the brake lamp of the other vehicle V1 is ON, the action plan generator 140 determines that the behavior control of the own vehicle M needs to be changed in order to avoid a collision with another vehicle V1 and regenerates the target trajectory by changing the behavior control such as reducing the speed of the own vehicle M or changing the lane. The action plan generator 140 outputs the generated target trajectory to the second controller 160.

In step S115, in a case where the action plan generator 140 determines that the behavior control of the own vehicle M does not need to be changed (step S115, "NO"), the action plan generator 140 does not change the behavior control. For example, as in the example of FIG. 4A, in a case where the secondary determination result indicates that the brake lamp of another vehicle V1 is "OFF", there is no problem even if a current traveling state is maintained, and thus the action plan generator 140 determines that the behavior control of the own vehicle M does not need to be changed and does not change the behavior control.

That is, in a case where the action plan generator 140 determines that the behavior control of the own vehicle M needs to be changed, the action plan generator 140 changes the behavior control of the own vehicle M. On the other hand, in a case where the action plan generator 140 determines that the behavior control of the own vehicle M does not need to be changed, the action plan generator 140 does not change the behavior control of the own vehicle.

In step S107 described above, in a case where the determiner 137 determines that the acquired certainty degree is not greater than the first threshold value (step S107, "NO"), the determiner 137 determines whether or not the certainty degree is less than the second threshold value (step S109). This second threshold value is set in advance as a criterion for determining whether or not the certainty degree is sufficiently low. For example, an upper limit value of the certainty degree for immediately determining that the corresponding intention determination result is not usable for the autonomous driving control is set as this second threshold value. In a case where the certainty degree is defined as a real number value between 0 and 1, a numerical value less than 0.5, for example, 0.1, 0.2, 0.3, 0.4, or the like is set as this second threshold value. A value smaller than the first threshold value is set for this second threshold value. The determiner 137 may determine whether or not the certainty degree is equal to or less than the second threshold value.

In step S109 described above, in a case where the determiner 137 determines that the acquired certainty degree is not less than the second threshold value (step S109, "NO"), the determiner 137 determines whether or not the number of the past intention determination results indicating the same determination result as an intention determination result of a current determination target among a predetermined number of the past intention determination results is equal to or more than a predetermined value (step S111).

Figure 8:
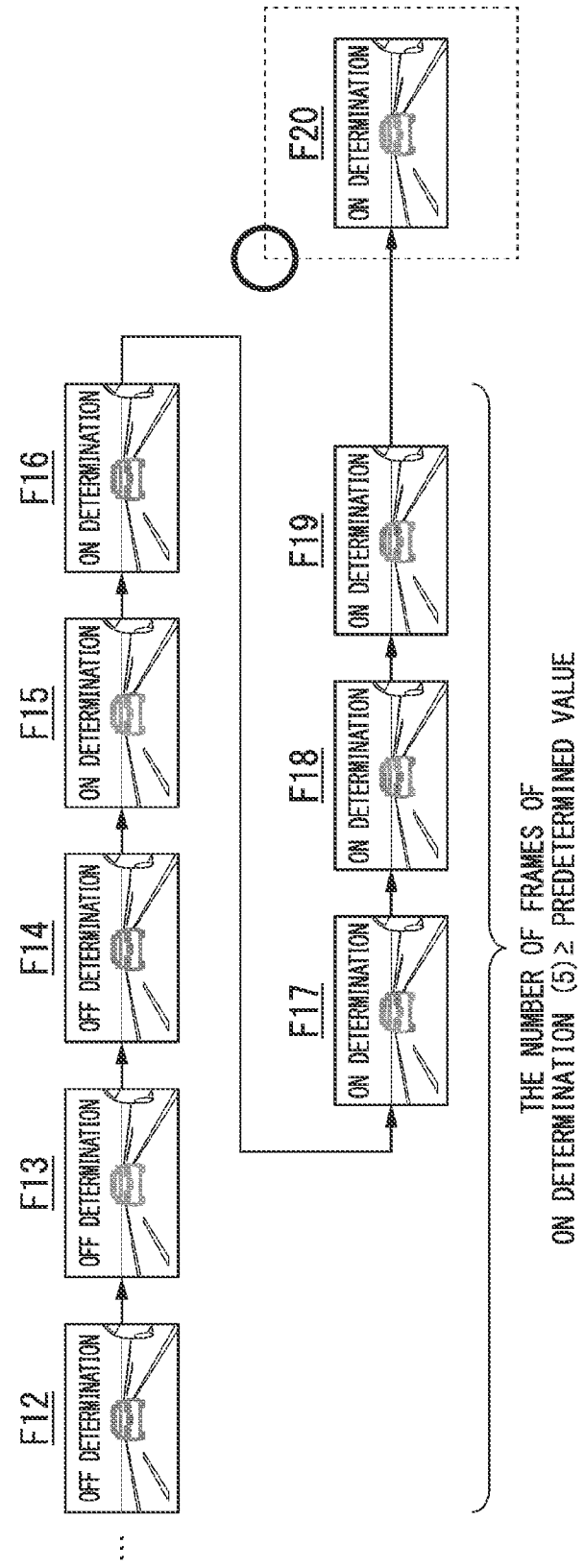
FIG. 8 is a diagram illustrating determination processing by a determiner according to the embodiment.
Figure 9:
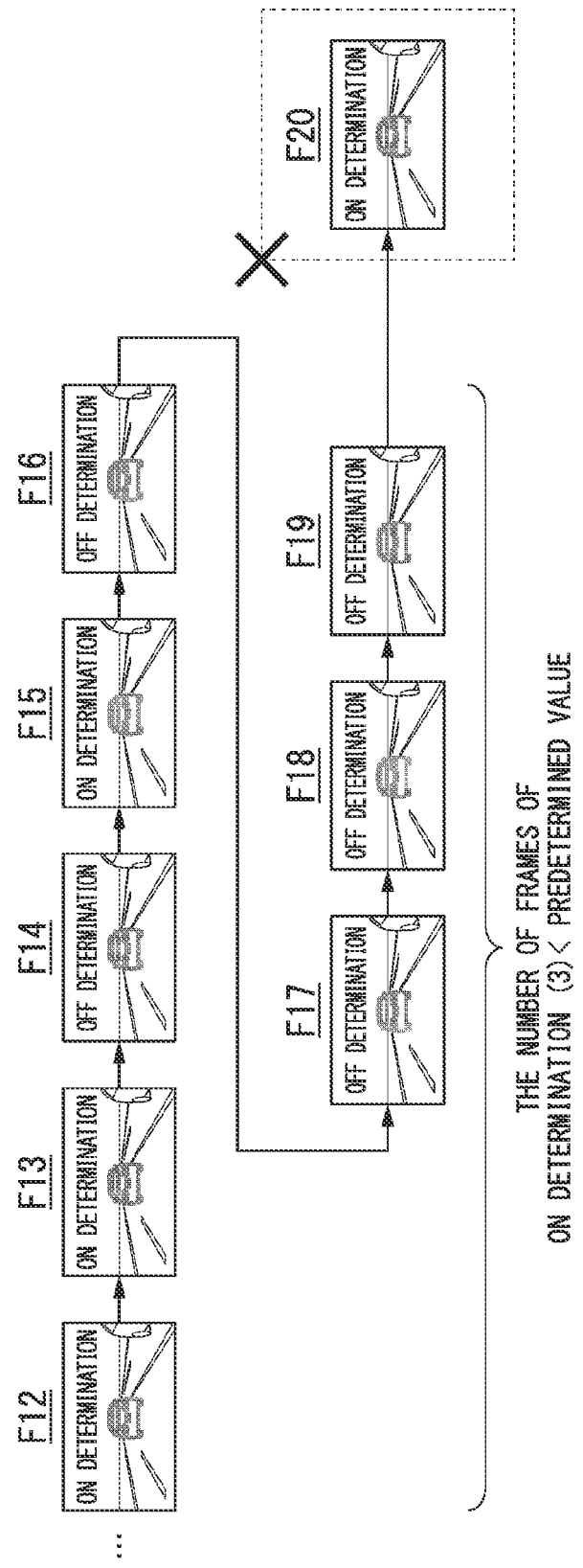
FIG. 9 is a diagram illustrating the determination processing by the determiner according to the embodiment.

For example, in a case where "0.9" is set as the first threshold value and "0.5" is set as the second threshold value, the determiner 137 performs the determination processing of step S111 described above for the surroundings image F20 (the certainty degree "0.60") shown in FIG. 7. FIGS. 8 and 9 are diagrams illustrating the determination processing of step S111. FIG. 8 shows the surroundings image F20 of the current determination target and surroundings images F12 to F19 for eight frames captured in the past earlier than the surroundings image F20. Among these past surroundings images F12 to F19, the past surroundings images having the same determination result as the determination result "brake lamp ON" of the surroundings image F20 are five past surroundings images F15 to F19. Here, for example, in a case where the predetermined value is set to "5," the determiner 137 determines that the number of the past intention determination results indicating the same determination result as the acquired intention determination result is equal to or more than the predetermined value.

On the other hand, in the example of FIG. 9, among the past surroundings images F12 to F19, the past surroundings images having the same determination result as the determination result "brake lamp ON" of the surroundings image F20 are three surroundings images F12, F13, and F15. Here, for example, in a case where the predetermined value is set to "5," the determiner 137 determines that the number of the past intention determination results indicating the same determination result as the acquired intention determination result is not equal to or more than the predetermined value. The determiner 137 may determine whether or not the number of the past intention determination results indicating the same determination result as the intention determination result of the current determination target is larger than the predetermined value.

That is, the determiner 137 performs first processing of outputting the primary determination result as the secondary determination result in a case where the certainty degree is greater than the first threshold value, performs second processing of withholding the secondary determination in a case where the certainty degree is less than the second threshold value and performs third processing of determining whether or not the primary determination result is employed as the secondary determination result on the basis of the past primary determination result in a case where the certainty degree is equal to or less than the first threshold value and equal to or more than the second threshold value.

Further, in the third processing, the determiner 137 outputs the primary determination result as the secondary determination result in a case where the number of the past primary determination results indicating the same determination result as the primary determination result among a predetermined number of the past primary determination results is equal to or more than a predetermined value and withholds the secondary determination in a case where the number of the past primary determination results indicating the same determination result as the primary determination result among a predetermined number of the past primary determination results is less than the predetermined value. The predetermined number of the past primary determination results is an integer N of 2 or more, and the predetermined value is a value of N/2 or more and N or less.

In step S111 described above, in a case where the determiner 137 determines that the number of the past intention determination results indicating the same determination result as the acquired intention determination result is equal to or more than the predetermined value (step S111, "YES"), the determiner 137 outputs the acquired intention determination result as the secondary determination result to the action plan generator 140 (step S113). As described above, the determiner 137 employs the intention determination result having high sustainability as the secondary determination result. Next, the action plan generator 140 determines whether or not the behavior control of the own vehicle M needs to be changed on the basis of the secondary determination result output by the recognizer 130 (step S115), and in a case where the action plan generator 140 determines that the behavior control of the own vehicle M needs to be changed, the generator 140 changes the behavior control (step S117).

On the other hand, in a case where the determiner 137 determines that the certainty degree acquired in the above step S109 is less than the second threshold value (step S109, "YES"), or in a case where the determiner 137 determines that the number of the past intention determination results indicating the same determination result as the intention determination result acquired in the above step S111 is not equal to or more than the predetermined value (step S111, "NO"), the determiner 137 withholds the secondary determination without employing the acquired intention determination result and outputs information indicating that the secondary determination is impossible (for example, an "Unknown" signal) to the action plan generator 140 (step S119). In this case, the determiner 137 may output the intention determination result and the certainty degree output from the intention determiner 133 to the action plan generator 140.

Next, the action plan generator 140 performs error control on the basis of the Unknown signal output from the recognizer 130 (step S121). For example, the action plan generator 140 performs the determination of the surrounding environment on the basis of surrounding environment information (information on the direction, the speed, the acceleration, or the like of another vehicle) obtained from a detection means (the radar device 12, the LIDAR 14, or the like) different from the camera 10 that has captured the surroundings image and determines whether or not the behavior control of the own vehicle M needs to be changed as the error control.

Alternatively, the action plan generator 140 may perform control processing of waiting until the output of the next secondary determination result while maintaining the current traveling state of the own vehicle M. Alternatively, the action plan generator 140 may perform control processing to change the behavior control to a safe side of the traveling state according to the current traveling state of the own vehicle M as the error control. For example, in a case where the current speed of the own vehicle M is equal to or higher than a predetermined threshold value, the action plan generator 140 may perform control to reduce the speed as control processing for changing the behavior control to a safe side of the traveling state. As a result, the processing of the present flowchart ends.

According to the embodiment described above, the acquirer 136 (an acquirer) that acquires a primary determination result of a surrounding environment determined on the basis of a first surroundings image of the own vehicle M and a certainty degree of the primary determination result, and the determiner 137 (a determiner) that performs secondary determination of the primary determination result on the basis of both a comparison result between the certainty degree and a preset threshold value and a past primary determination result of a surroundings image of the own vehicle M captured in the past earlier than the first surroundings image and outputs a secondary determination result having higher accuracy than the primary determination result are provided, and thus it is possible to detect the surrounding environment of the own vehicle M by an accurate and simple method and to suppress the occurrence of over-detection of the surrounding environment. Further, it is possible to perform stable autonomous driving control by determining whether or not behavior control of the own vehicle M needs to be changed on the basis of the secondary determination result.

The embodiment described above can be expressed as follows.

A determination device includes a storage device in which a processor stored and a hardware processor, wherein the hardware processor executes a program to acquire a primary determination result of a surrounding environment determined based on a first surroundings image of a vehicle and a certainty degree of the primary determination result, and to perform secondary determination of the primary determination result based on both a comparison result between the certainty degree and a preset threshold value and a past primary determination result of a surroundings image of the vehicle captured in the past earlier than the first surroundings image and to output a secondary determination result having higher accuracy than the primary determination result.

Although the embodiments for carrying out the present invention have been described above using the embodiments, the present invention is not limited to these embodiments, and various modifications and substitutions can be added without departing from the gist of the present invention.

What is claimed is:

1. A determination device comprising a processor configured to execute computer-readable instructions to perform:
   acquiring a primary determination result of a surrounding environment determined based on feature information and a certainty degree of the primary determination result;
   performing secondary determination of the primary determination result based on both a comparison result between the certainty degree and a preset threshold value and a past primary determination result of a surroundings image of a vehicle captured in the past earlier than the feature information; and
   controlling the vehicle based on a secondary determination result having higher accuracy than the primary determination result,
   wherein the preset threshold value includes a first threshold value and a second threshold value lower than the first threshold value, and
   wherein the processor executes the computer-readable instructions to perform:
   performing first processing of outputting the primary determination result as the secondary determination result in a case where the certainty degree is greater than the first threshold value;
   performing second processing of withholding the secondary determination in a case where the certainty degree is less than the second threshold value; and
   performing third processing of determining whether or not the primary determination result is employed as the secondary determination result based on the past primary determination result in a case where the certainty degree is equal to or less than the first threshold value and equal to or more than the second threshold value.

2. The determination device according to claim 1, wherein, in the third processing, the processor executes the computer-readable instructions to perform:
   outputting the primary determination result as the secondary determination result in a case where the number of the past primary determination results indicating the same determination result as the primary determination result among a predetermined number of the past primary determination results is equal to or more than a predetermined value; and
   withholding the secondary determination in a case where the number of the past primary determination results indicating the same determination result as the primary determination result among a predetermined number of the past primary determination results is less than the predetermined value.

3. The determination device according to claim 2, wherein the predetermined number of the past primary determination results is an integer N of 2 or more, and the predetermined value is a value of N/2 or more and N or less.

4. The determination device according to claim 1, wherein, in a case where withholding the secondary determination, the processor executes the computer-readable instructions to perform outputting information indicating that the secondary determination is impossible.

5. The determination device according to claim 1, wherein the primary determination result is a determination result of a traveling state of a surrounding vehicle included in the feature information based on operation information on a lamp body of a surrounding vehicle.

6. The determination device according to claim 5, wherein the lamp body includes at least one of a brake light and a direction indicator.

7. A vehicle control device comprising:
the determination device according to claim 1; and
a controller configured to determine whether or not behavior control of the vehicle needs to be changed based on the secondary determination result output from the determination device.

8. The vehicle control device according to claim 7, wherein, in a case where the controller determines that the behavior control of the vehicle needs to be changed based on the secondary determination result, the controller changes the behavior control of the vehicle.

9. The vehicle control device according to claim 7, wherein, in a case where the controller determines that the behavior control of the vehicle does not need to be changed based on the secondary determination result, the controller does not change the behavior control of the vehicle.

10. The vehicle control device according to claim 7, wherein, in a case where the secondary determination is withheld by the processor, the controller determines whether or not the behavior control of the vehicle needs to be changed based on surrounding environment information acquired by a detection means different from a camera that captures the feature information.

11. The vehicle control device according to claim 7, wherein the controller determines whether or not at least one of speed control, acceleration control, steering control, and stop control of the vehicle needs to be changed.

12. A determination method comprising:
acquiring, by a computer installed in a vehicle, a primary determination result of a surrounding environment determined based on feature information and a certainty degree of the primary determination result;
performing, by the computer, secondary determination of the primary determination result based on both a comparison result between the certainty degree and a preset threshold value and a past primary determination result of a surroundings image of a vehicle captured in the past earlier than the feature information; and
controlling, by the computer, the vehicle based on a secondary determination result having higher accuracy than the primary determination result,
wherein the preset threshold value includes a first threshold value and a second threshold value lower than the first threshold value;
performing, by the computer, first processing of outputting the primary determination result as the secondary determination result in a case where the certainty degree is greater than the first threshold value;
performing, by the computer, second processing of withholding the secondary determination in a case where the certainty degree is less than the second threshold value;
and performing, by the computer, third processing of determining whether or not the primary determination result is employed as the secondary determination result based on the past primary determination result in a case where the certainty degree is equal to or less than the first threshold value and equal to or more than the second threshold value.

13. A non-transitory computer-readable storage medium that stores a program causing a computer installed in a vehicle to perform:
acquiring a primary determination result of a surrounding environment determined based on feature information and a certainty degree of the primary determination result;
performing secondary determination of the primary determination result based on both a comparison result between the certainty degree and a preset threshold value and a past primary determination result of a surroundings image of the vehicle captured in the past earlier than the feature information; and
controlling the vehicle based on a secondary determination result having higher accuracy than the primary determination result,
wherein the preset threshold value includes a first threshold value and a second threshold value lower than the first threshold value;
performing first processing of outputting the primary determination result as the secondary determination result in a case where the certainty degree is greater than the first threshold value;
performing second processing of withholding the secondary determination in a case where the certainty degree is less than the second threshold value; and
performing third processing of determining whether or not the primary determination result is employed as the secondary determination result based on the past primary determination result in a case where the certainty degree is equal to or less than the first threshold value and equal to or more than the second threshold value.

* * * * *